June 27, 1933. W. C. HEDGCOCK ET AL 1,916,138
TRUCK
Filed Aug. 27, 1931 7 Sheets-Sheet 2

Inventors:
William C. Hedgcock,
Robert F. Darby

June 27, 1933. W. C. HEDGCOCK ET AL 1,916,138
TRUCK
Filed Aug. 27, 1931    7 Sheets-Sheet 7

Inventors:
William C. Hedgcock,
Robert F. Darby
By Wilkinson, Huxley, Byron & Knight
Attys.

Patented June 27, 1933

1,916,138

UNITED STATES PATENT OFFICE

WILLIAM C. HEDGCOCK, OF WILMETTE, AND ROBERT F. DARBY, OF OAK PARK, ILLINOIS, ASSIGNORS TO AMERICAN STEEL FOUNDRIES, OF CHICAGO, ILLINOIS, A CORPORATION OF NEW JERSEY

TRUCK

Application filed August 27, 1931. Serial No. 559,617.

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity.

Passenger car trucks are generally easy riding, due to the use of both coil and elliptic leaf springs in series; the coil springs responding to the light, quick shocks, the leaf springs to the slow, heavy impulses. Coil springs are quick and sensitive in response, leaf springs relatively less so, partly due to frictional work absorption between the leaves. For this reason, and also by providing coil and leaf springs of different natural vibration periods, they tend to dampen each other's synchronous vibration without impairing free spring response. This condition is obtained by having the different springs in series. Placing leaf and coil springs in parallel is not sufficient, since they then act as a unit and have a common period of vibration.

Although the usual passenger car truck with series arrangement of coil and leaf springs gives good riding qualities, it is undesirably heavy, costly and complicated for freight service. This is partly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Another object of the invention is to provide a car truck wherein the spring suspension is such that springs of different character are placed in series.

Yet another object of the invention is to provide a car truck having springs of different characteristics in series and so disposed that complete duplication of carrying capacity is not required in both kinds of springs.

A further object of the invention is to provide a car truck having springs of different character which are adapted to work independently of each other whereby shocks incident to operation are adequately absorbed.

A still further object of the invention is to provide a car truck wherein the springs are arranged so that each dampens out the other's vibration.

A yet further object is to provide a truck construction wherein resilient pads are provided for dampening out metallic vibrations transmitted through the metallic truck parts, and also for the purpose of deadening noise.

Another further object is to provide a truck construction wherein resilient and friction and/or resilient means are disposed in series.

A different object is to provide spring assemblies wherein there is provided softer cushioning action under light loads, while at the same time providing the necessary stiffness and capacity under heavy loads, these features being combined also to provide a construction which reduces any tendency toward synchronous vibration of the springs.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1:
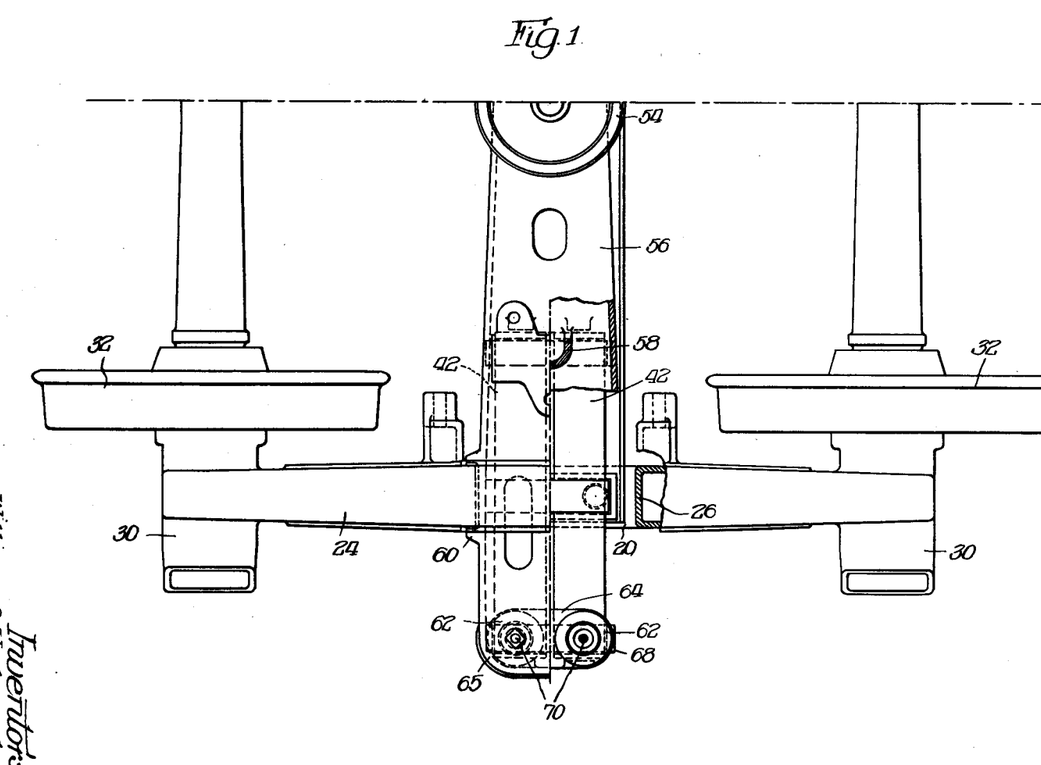
Figure 1 is a fragmentary sectional top plan view of a truck embodying the invention.
Figure 2:
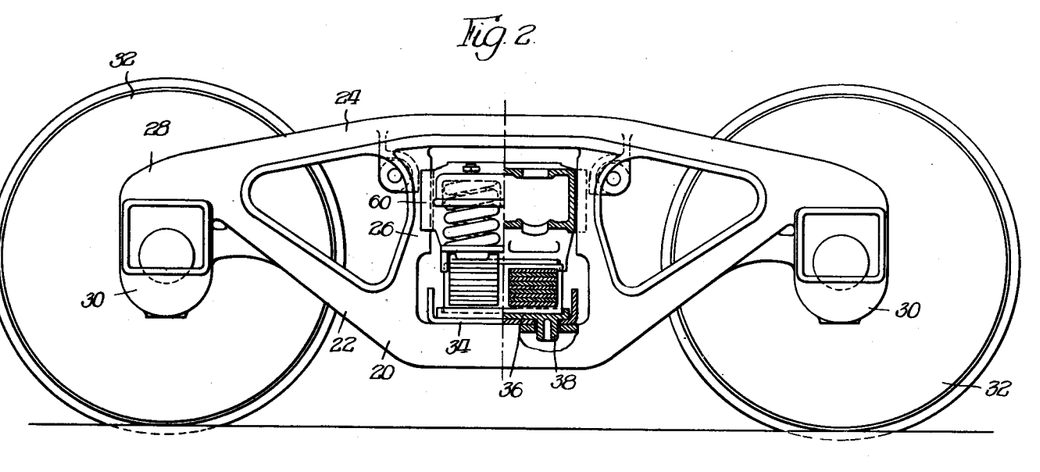
Figure 2 is a partial sectional elevation of the trucks shown in Figure 1.
Figure 3:
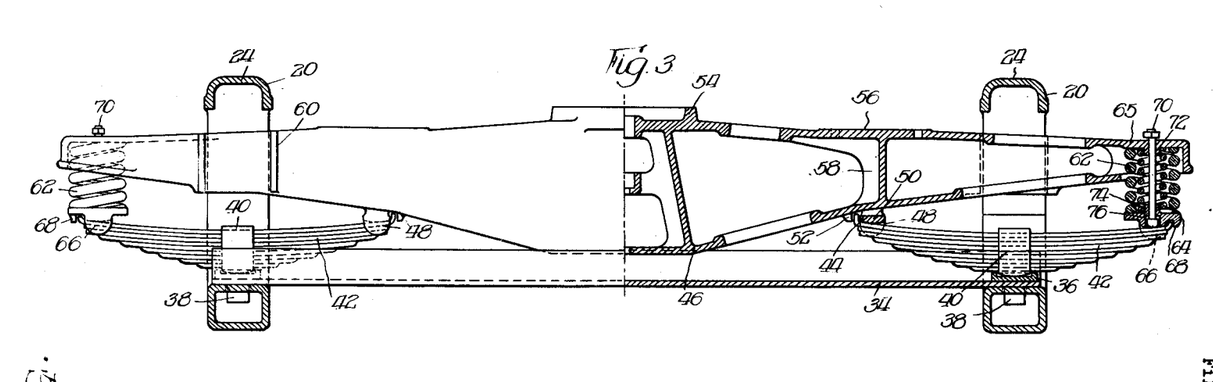
Figure 3 is a transverse sectional elevation through the bolster and side frame of the truck shown in Figures 1 and 2.

Referring first of all more particularly to the truck construction shown in Figures 1 to 3 inclusive, the side frame 20 is of integral truss construction, and includes the tension member 22, the compression member 24, and the spaced column guides 26 connecting said tension and compression members. In the truck shown the tension and compression members merge adjacent their ends as at 28 and are provided with the usual standard A. R. A. journal boxes 30 cooperating with the wheel and axle assemblies 32. It will of course be understood that the journal box may be separate or of any special construction, and the wheel and axle assemblies may also be of any construction.

The spaced side frames are connected by the spring plank 34 extending transversely of the truck, the spring plank being provided with the vertically disengageable spring seat 36 preferably disposed on the longitudinal center line of the side frames and laterally positioned by means of the dowels 38 which extend through apertures in the spring plank and side frame whereby the spring plank and side frame are also connected thereby. The spring seats 36 are adapted to accommodate the spring band 40 of the semi-elliptic springs 42, which band is preferably provided with an arcuate seat engaging portion. The inner end of the semi-elliptic springs has supporting cooperation with the spring seat 44 provided on the bolster 46, the spring seat including the depending positioning flanges 48, the arcuate seat engaging portion 50 and the limiting lug 52 thus forming a direct acting support.

The bolster is provided with the center bearing 54, the side bearings 56, and preferably also with the vertical brace members 58 disposed adjacent the side bearings and bracket 44. The bolster is provided with the lugs 60 adapted to embrace the column guides 26 for guiding cooperation therewith. The bolster extends outwardly of the side frames 20, the lower web thereof being interrupted adjacent the end to permit the coil spring assembly 62 to extend into the bolster for cooperation with the seat 65. The coil spring nests are provided with the spring seats 64 which are adapted to be engaged by the outer end of the semi-elliptic springs 42, the spring seats 64 being similar to the brackets 44 providing the arcuate spring engaging seat, and the depending embracing lugs 66 and the lug 68. In order to maintain the coil springs in proper relation to the bolster and spring seat 64 an adjustable bolt 70 extends through the boss 72 of the bolster and through a similar boss 74, and into pocket 76 of spring seat 64.

Figure 4:
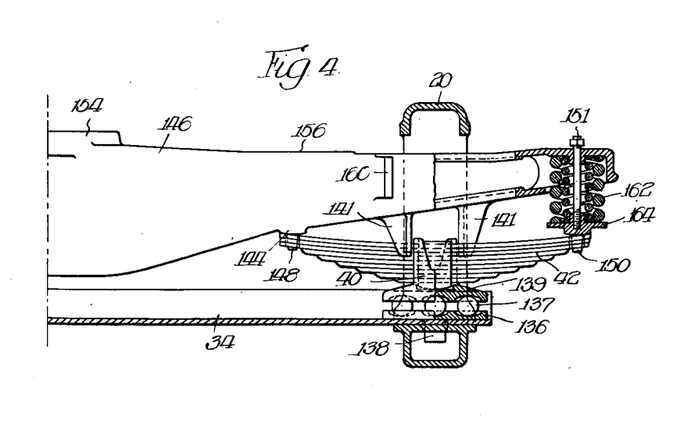
Figure 4 is a fragmentary transverse sectional elevation through a modified form of truck embodying the invention.
Figure 5:
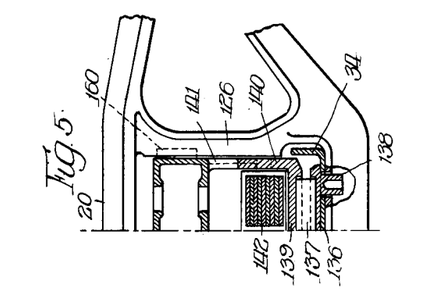
Figure 5 is a fragmentary sectional side elevation of the truck shown in Figure 4.

In the construction shown in Figures 4 and 5, the side frame 20 is provided with column guides 126 which are provided with an extended guiding portion, the guiding portion extending downwardly adjacent the spring plank 34. In this case the spring plank is provided with the roller seat 136 for accommodating the anti-friction rollers 137, the roller seat being positioned by means of the dowels 138. An upper roller seat or cap 139 is also provided adapted to form a seat for the spring band 40 of the semi-elliptic spring 42, the upper roller seat being provided with upwardly extending members or guide wings 140 having guiding cooperation with the column guides 126 and embracing the leaf spring assemblies. The wings also serve to position the roller cap with respect to the bolster by engagement with the depending guide lugs 141.

The semi-elliptic springs 42 have supporting engagement with the bolster 146 through the inner spring seat 144 and through the outer coil spring assemblies 162, the coil spring assemblies being provided with the spring seat 164, the spring seats 144 and 164 being adapted to be positioned by means of the depending dowels 148 and 150 received in suitable apertures in the leaf springs, and also by the adjusting bolt connection 151 extending from the spring seat through the bolster. The bolster is provided with the center bearing 154 and the side bearings 156, and lateral motion of the bolster is limited by means of the lugs 160.

Figure 6:
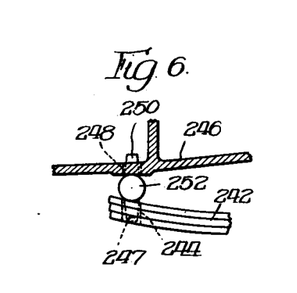
Figure 6 is a fragmentary sectional elevation through a form of spring end connection.
Figure 7:
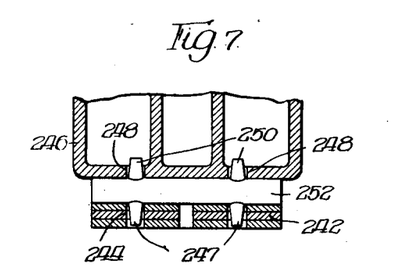
Figure 7 is a sectional elevation taken substantially at right angles to the spring and connection shown in Figure 6.

Figures 6 and 7 show a form of spring end connection which may be used with this type of truck. The bolster 246 is apertured as at 248 for the reception of the upwardly extending positioning dowels 250 provided on the roller 252, the roller being engaged by the leaf springs 242, the leaf springs being apertured as at 244 for the reception of a depending dowel 247 corresponding to the upwardly extending dowels 250 so that with this construction a centering and anti-friction device is provided.

Figure 8:
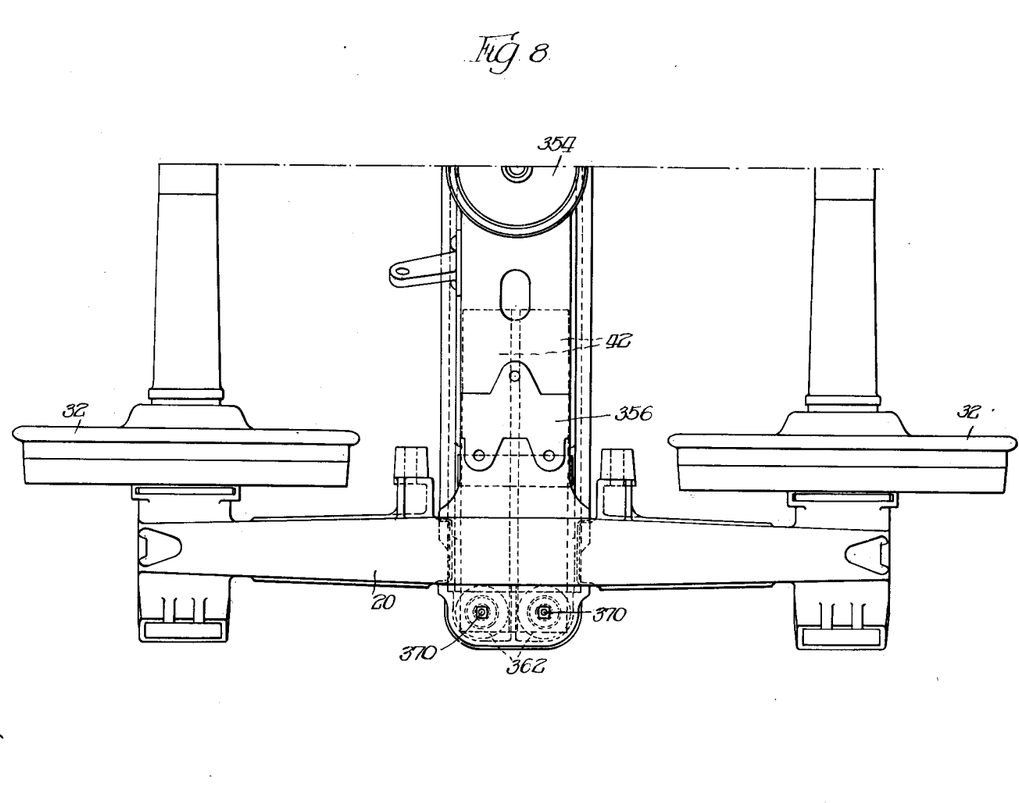
Figure 8 is a fragmentary sectional top plan view of another modified form of truck embodying the invention.
Figures 9, 10, 11:
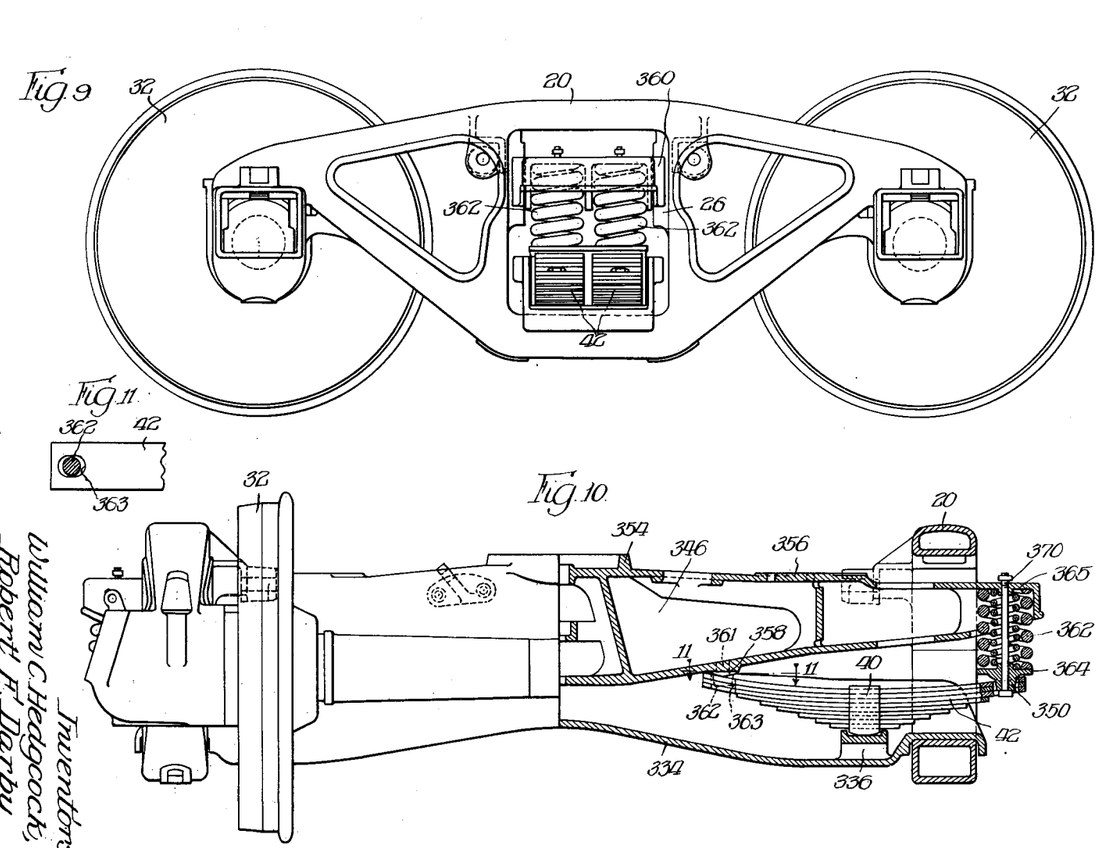
Figure 9 is a side elevation of the truck shown in Figure 8.
Figure 10 is a transverse sectional elevation through the bolster and side frame of the truck shown in Figures 8 and 9.
Figure 11 is a top plan view of a spring connection, the same being taken substantially in the plane as indicated by the line 11—11 of Figure 10.

In the truck construction shown in Figures 8, 9 and 10 the side frame 20 and the wheel and axle assemblies 32 are substantially the same as have already been described, the side frame being provided with the column guides 26. In this case the spring plank 334 is provided with a spring seat 336 disposed inwardly of the side frames, said spring seat being adapted to have cooperative relation with the spring band 40 of the coil spring assembly 42. With this construction a shorter bolster 346 can be provided, the bolster shown including the center bearing 354 and the side bearings 356, the bolster having flanges 360 having guiding cooperation with the column guides 26.

The inner end of the leaf spring assembly 42 is supported on the seat member 358, the seat member having an upwardly extending dowel 361 received in a suitable aperture provided in the bolster member and also provided with the depending dowel 362 received in an elongated opening or aperture 363 in the semi-elliptic springs, as clearly shown in Figure 11 of the drawings, the spring engaging portion of the member 358 corresponding substantially to the normal position of the spring. The outer end of the leaf spring assembly extends slightly beyond the side frames 20 and engages the coil spring seat 364, said seat being positioned by means of the depending dowel 350 received in a suitable aperture in the semi-elliptic springs and also by the bolt construction 370 extending through the coil spring seat 365. The coil spring assemblies 362 are disposed between the spring seats 364 and 365 for supporting cooperation between the bolster and leaf spring.

Figures 12, 13, 14, 15, 16, 17:
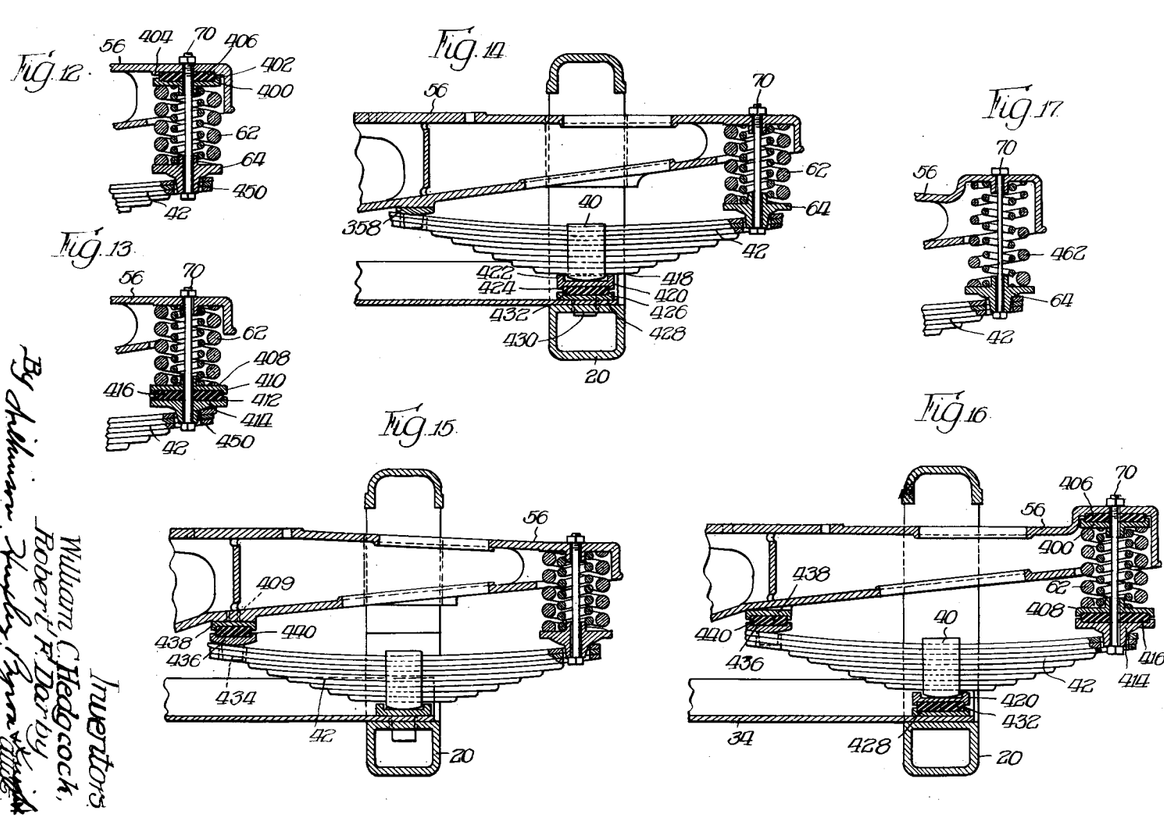
Figures 12 to 16 inclusive are enlarged transverse fragmentary sectional elevations of forms of the truck construction embodying the invention showing the application of additional cushioning means thereto.
Figure 17 is an enlarged transverse fragmentary sectional elevation through the truck assembly showing a modified form of cushioning means.

In the truck construction illustrated in Figure 12, which is similar to that shown and described in Figures 1 to 3 inclusive, the coil spring assembly 62 is mounted on seat 64 which in turn is supported on the leaf spring assembly 42. A spring cap 400 is provided on the coil spring assembly, the cap having an upturned flange 402 between which and a suitable flange 404 provided on the bolster there is mounted the rubber insert 406, the entire assembly being secured and positioned by means of the adjustable bolt 70, and also positioned by the depending dowel 450 received in an aperture in the semi-elliptic spring 42.

In the assembly shown in Figure 13 the coil spring assembly 62 is disposed between the bolster 56 and the spring seat 408, said spring seat being provided with a downwardly extending flange 410 facing the flange 412 provided on the seat member 414, the rubber insert 416 being provided between members 414 and 408. The member 414 is mounted on the leaf springs 42 and the spring assembly is positioned and secured by means of the adjustable bolt 70, and also positioned by the depending dowel 450 received in an aperture in the semi-elliptic spring 42.

In the construction shown in Figure 14 the spring assembly 62 is mounted between the bolster 56 and the supported member 64, said member being positioned on the leaf spring assembly 42, there being provided the adjustable bolt 70 extending through the bolster, spring assembly, and member 64. The inner end of the leaf spring 42 is mounted on the seat member 358 as described with respect to Figure 10, the member 358 being provided on the bolster 56. The spring band 40 is provided with an arcuate portion 418 engaging the seat member 420, said seat member being provided with the upper guiding flange 422 and the lower flange 424 facing the flange 426 of the supporting member 428, said member being provided with the positioning dowel 430 extending through the spring plank 34 into an opening in the side frame 20. A rubber insert 432 is provided between the members 420 and 428 and positioned by means of their facing flanges 424 and 426.

In the construction shown in Figure 15 the inner end of the leaf spring 42 is positioned by means of the dowel 434 on the member 436, between which member and the member 438 a rubber insert 440 is provided, the member 438 being positioned on the bolster 56 by the dowel 439, the remainder of the assembly being similar to that described with respect to Figures 1, 2 and 3.

Figure 16 combines the assemblies shown in Figures 12 to 15 inclusive, there being provided the leaf spring 42 having supporting engagement with the member 414, the rubber insert 416 being provided between said member and the spring seat member 408. The coil spring assembly 62 is mounted on the spring seat assembly 408, the top of the assembly having supporting engagement with the member 400, there being provided the rubber insert 406 between said member and the bolster 56, the adjustable bolt 70 being provided for positioning the assembly. The inner end of the semi-elliptic spring 42 has engagement with the member 436, the rubber insert 440 being provided between said member and the member 438 provided on the bolster. The spring band 40 engages the member 420, the rubber insert 432 being provided between said member and the member 428 mounted on the spring plank 34 and the side frame 20.

In the construction shown in Figure 17 the leaf spring 42 is provided with the member 64 and a tapering coil spring assembly 462 is provided on the member 64 and supportingly engages the bolster 56, the adjustable bolt 70 being provided for the assembly. In this construction the coil spring is formed from a bar of tapering diameter, that is, the bar before coiling has a gradually increasing diameter from one end to the other. When wound into a spring having substantially uniform spacing between the coils such a tapered bar spring has the coils close successively under load, that is, the coils close progressively from the small diameter portion of the bar to the large diameter portion of the bar. This provides a coil spring of variable stiffness having considerable softness under light loads and considerable stiffness and high capacity under heavy loads. On account of its varying stiffness such a spring also does not build up synchronous vibration to the extent of an ordinary coil spring.

Another modification may be had by using a variable stiffness coil spring, the coil spring being formed from a bar of uniform diameter but wound in a variable pitch so that the coils close progressively from the smallest pitch to the greatest pitch. This also provides a coil spring of variable stiffness having considerable softness under light loads and considerable stiffness and high capacity under heavy loads. This also tends to avoid synchronous vibration.

Figure 18:
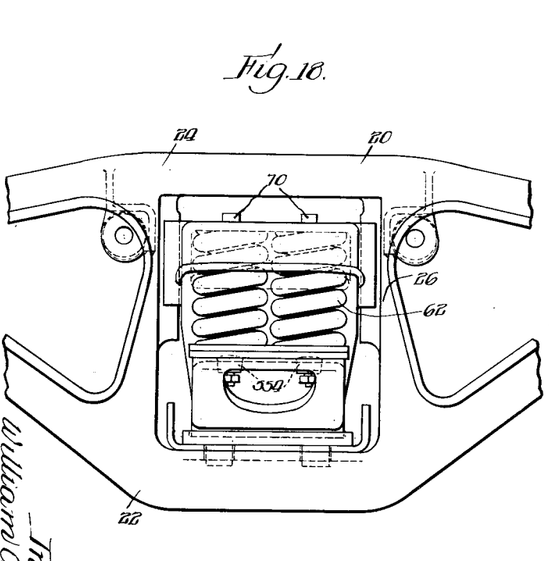
Figure 18 is a fragmentary side elevation of another form of truck assembly embodying the invention.
Figure 19:
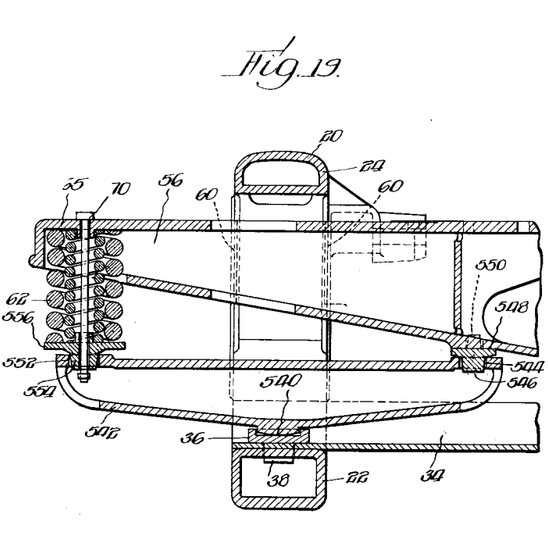
Figure 19 is a transverse sectional elevation of the truck shown in Figure 18.

Referring now more particularly to the construction shown in Figures 18 and 19, it being understood that the coil springs shown may be of the construction described above and below, the side frame 20 and the bolster 56 are similar to that described in Figure 3, the bolster extending through the bolster opening formed by the spaced column guides 26 and the tension and compression members 22 and 24, and co-operating with said column guides through members 60. The spaced side frames are connected by means of the spring plank 34, and the seat 36 is provided substantially on the longitudinal center line of each side frame, depending dowels 38 extending through suitable openings in the spring plank and tension member.

In this case, instead of providing a resilient member such as the semi-elliptic coil springs 42, which in effect form resilient equalizing members, an equalizing member 542 is provided, being formed with a seat member 540, being rockably received in the seat 36. The member 542 extends inwardly and is apertured as at 544 for the reception of the depending dowel 546 of the seat member 548, said seat member being provided with a dowel 550 received in a suitable aperture in the bolster. It will, of course, be understood that a flat seat may be provided on the bolster or an anti-friction member carried on the equalizer member. The outer end of the equalizer member is apertured as at 552 for the reception of the depending dowel 554 of the spring seat 556 whereby said spring seat is positioned. A coil spring assembly 62 is disposed between the seat 556 and the seat 65 of the bolster, an assembly and positioning bolt 70 being provided extending through the spring seat 65 and the spring seat 556.

With such construction loads are transmitted from the bolster to the side frame resiliently through the coil spring and non-resiliently through the equalizer member, loads through the non-resilient connection equalizing through the rocker action of the equalizer and the resilient connection.

Of course, it is to be understood that the rubber pads may be used in any combination in any of the constructions shown, and that the term rubber is used to cover any substance having cushioning qualities such as rubber has. By the use of rubber or resilient pads the metallic vibrations coming through the truck structure are dampened out, thereby promoting easy riding as well as relieving the truck parts, car body and lading of the destructive action which might be caused by minute vibrations. The rubber pads also serve to deaden the noise which would otherwise be transmitted through the metallic parts.

It is also to be understood that any spring arrangement such as shown in application Serial No. 552,153, filed July 21, 1931, may be used, and that we do not wish to be limited by the exact embodiments of the device shown, which are merely by way of illustration and not limitation, as various an' other forms of the device will of course be apparent to those skilled in the art without departing from the spirit of the invention or the scope of the claims.

What is claimed is—

1. In a car truck, the combination of a side frame having a tension and compression member and spaced column guides, a bolster having guide members slidably cooperating with said guides, said bolster having an end portion extending outwardly of said side frame, a leaf spring mounted on said side frame between said guides and having an end disposed inwardly of said side frame and in supporting relation to said bolster, said spring having an outer end disposed outwardly of said side frame, and a coil spring interposed between said outer end of said spring and said end portion of said bolster.

2. In a car truck, the combination of a side frame having a tension and compression member and spaced column guides, a bolster having guide members slidably cooperating with said guides, said bolster having an end portion extending outwardly of said side frame, a leaf spring mounted on said side frame and in the plane thereof and between said guides and having an end disposed inwardly of said side frame and in supporting relation to said bolster, said spring having an outer end disposed outwardly of said side frame, and a coil spring interposed between said outer end of said spring and said end portion of said bolster.

3. In a car truck, the combination of a side frame having a tension and compression member and spaced column guides, a bolster extending between said guides, said bolster having an end portion extending outwardly of said side frame, a leaf spring mounted on said side frame between said guides and having an end disposed inwardly of said side frame and in supporting relation to said bolster, said spring having an outer end disposed outwardly of said side frame, and a coil spring interposed between said outer end of said spring and said end portion of said bolster.

4. In a car truck, the combination of a side frame having a tension and compression member and spaced column guides, a bolster extending between said guides, said bolster having an end portion extending outwardly of said side frame, a leaf spring mounted on said side frame and in the plane thereof and between said guides and having an end disposed inwardly of said side frame and in supporting relation to said bolster, said spring having an outer end disposed outwardly of said side frame, and a coil spring interposed between said outer end of said spring and said end portion of said bolster.

5. In a car truck, the combination of a side frame and a bolster extending outwardly of said side frame, a coil spring, a leaf spring having three points of connection, one point connecting said leaf spring to said bolster and a second point connecting said leaf spring to said side frame, the third point connecting said leaf spring to said bolster through said coil spring disposed outwardly of said side frame, said second point being intermediate the ends of said leaf spring.

6. In a car truck, the combination of a side frame and a bolster, a spring mounted on said side frame and disposed to be fixed against bodily movement with respect thereto, said spring supporting said bolster through a non-resilient engagement at one point and through a resilient connection at another point.

7. In a car truck, the combination of a side frame and a bolster, a coil spring, a leaf spring mounted on said side frame and disposed to be fixed against bodily movement with respect thereto, said spring supporting said bolster, said leaf spring having non-resilient connection with said bolster at one point, and resilient connection with said bolster at another point through said coil spring.

8. In a car truck, the combination of a side frame and a bolster, a coil spring, a leaf spring carried intermediate its ends by said side frame, one end of said leaf spring having non-resilient connection with said bolster, the other end of said leaf spring having resilient connection with said bolster through said coil spring.

9. In a car truck, the combination of a side frame and a bolster, a leaf spring carried directly on said side frame, and a coil spring supported on an end of said leaf spring and disposed between said leaf spring and bolster and engaging said bolster.

10. In a car truck, the combination of spaced side frames, one at each side of the truck, a transverse member extending between said side frames, and resilient supporting means comprising leaf springs and coil springs interposed between said side frames and said transverse member and disposed above the supporting portion of said side frame, said resilient supporting means having four points of engagement with said transverse member transversely of the truck, each of said four points of engagement with said transverse member acting in the same direction.

11. In a car truck, the combination of spaced side frames, a spring plank connecting said side frames, a bolster, a leaf spring mounted on said spring plank whereby it is carried by said side frame, and a coil spring interposed directly between an end of said leaf spring and said bolster.

12. In a car truck, the combination of spaced side frames and a spring plank connecting the same, a transverse member extending between the side frames, leaf springs mounted on said spring plank whereby they are carried by said side frames, one end of each leaf spring cooperating directly with said transverse member, the opposite end of said leaf spring cooperating with said transverse member through a coil spring.

13. In a car truck, the combination of a side frame and a bolster, a leaf spring carried by said side frame and mounted for lateral motion with respect thereto, and a coil spring interposed between an end of said leaf spring and said bolster to constitute a direct acting support.

14. In a car truck, the combination of a side frame and a bolster, lateral motion means carried by said side frame, a leaf spring mounted on said lateral motion means, said leaf spring supporting said bolster through a non-resilient engagement at one end of said spring and through a resilient connection at the other end of said spring.

15. In a car truck, the combination of a side frame, lateral motion means carried thereby, a bolster, and a semi-elliptic spring mounted on said lateral motion means and supporting said bolster partly through a non-resilient direct acting support on said bolster, said support acting downwardly, and partly through another spring, said other spring engaging said bolster at a direct acting support.

16. In a car truck, the combination of a side frame, lateral motion roller means carried thereby, a bolster, and a spring mounted on said lateral motion roller means and supporting said bolster partly directly and partly through another spring.

17. A truck bolster having spaced spring seats, one at each end thereof, spaced guide means between said spaced spring seats, and second spaced spring seats between said spaced guide means.

18. In a car truck, the combination of a side frame, a leaf spring, a spring seat mounted on the end of said leaf spring, a transverse member, and a coil spring interposed between said spring seat and said transverse member to constitute a direct acting support.

19. In a car truck, the combination of a side frame, a semi-elliptic spring supported thereby, and a bolster supported by said spring at spaced points, one of said spaced points including a disengageable spring seat having integral means for positioning said spring seat on said bolster.

20. In a box section truck bolster having an upper wall and a lower wall connected by spaced side walls, a side bearing seat on said upper wall, a spring seat on said lower wall beneath said side bearing seat, and a strut member extending vertically between said side bearing seat and said spring seat.

21. In a car truck, the combination of a side frame having a tension and compression member and spaced column guides, a bolster having guide members slidably cooperating with said guides, said bolster having an end portion extending outwardly of said side frame, a friction assembly mounted on said side frame between said column guides and supporting said bolster at a plurality of points, and resilient means interposed between said bolster and one of said points of support.

22. In a car truck, the combination of a side frame having a tension and compression member and spaced column guides, a bolster having guide members slidably cooperating with said guides, said bolster having an end portion extending outwardly of said side frame, a friction assembly mounted on said side frame between said column guides and supporting said bolster at a plurality of points, and a coil spring interposed between said bolster and one of said points of support.

23. In a car truck, the combination of a side frame, a bolster, a friction assembly carried by said side frame, and supporting said bolster through a non-resilient connection at one point and through a resilient connection at another point, said points of support being on said bolster and above said friction assembly.

24. In a car truck, the combination of a side frame, a bolster, a friction assembly carried by said side frame and supporting said bolster through a non-resilient connection at one point and through a coil spring at another point, said points of support being on said bolster and above said friction assembly.

25. In a car truck, the combination of a side frame and a bolster, a coil spring, a leaf spring carried intermediate its ends by said side frame, one end of said leaf spring having non-resilient connection with said bolster, the other end of said leaf spring having resilient connection with said bolster through said coil spring, and resilient pads disposed between said springs, and between said springs and said bolster and side frame.

26. In a car truck, the combination of a side frame and a bolster, a coil spring, a leaf spring carried intermediate its ends by said side frame, one end of said leaf spring having non-resilient connection with said bolster, the other end of said leaf spring having resilient connection with said bolster through said coil spring, and resilient pads disposed between said springs.

27. In a car truck, the combination of a side frame and a bolster, a coil spring, a leaf spring carried intermediate its ends by said side frame, one end of said leaf spring having non-resilient connection with said bolster, the other end of said leaf spring having resilient connection with said bolster through said coil spring, and resilient pads disposed between said springs and said bolster and side frame.

28. In a car truck, the combination of a side frame and a bolster, a coil spring, a leaf spring carried intermediate its ends by said side frame, one end of said leaf spring having non-resilient connection with said bolster, the other end of said leaf spring having resilient connection with said bolster through said coil spring, said coil spring being of variable pitch.

29. In a car truck, the combination of a side frame and a bolster, a coil spring, a leaf spring carried intermediate its ends by said side frame, one end of said leaf spring having non-resilient connection with said bolster, the other end of said leaf spring having resilient connection with said bolster through said coil spring, said coil spring being of variable stiffness.

30. In a car truck, the combination of a side frame and a bolster, a coil spring, a leaf spring carried intermediate its ends by said side frame, one end of said leaf spring having non-resilient connection with said bolster, the other end of said leaf spring having resilient connection with said bolster through said coil spring, said coil spring being of variable section.

31. In a car truck, the combination of a side frame and a bolster, a coil spring, a leaf spring carried intermediate its ends by said side frame, one end of said leaf spring having non-resilient connection with said bolster, the other end of said leaf spring having resilient connection with said bolster through said coil spring, said coil spring being of tapering section.

32. In a car truck, the combination of a side frame and a bolster, a coil spring, a leaf spring carried intermediate its ends by said side frame, one end of said leaf spring having non-resilient connection with said bolster, the other end of said leaf spring having resilient connection with said bolster through said coil spring, said coil spring being of tapering section and variable pitch.

33. In a car truck, the combination of a side frame and a bolster, a coil spring, a leaf spring carried intermediate its ends by said side frame, one end of said leaf spring having non-resilient connection with said bolster, the other end of said leaf spring having resilient connection with said bolster through said coil spring, said coil spring being of tapering section and constant pitch.

34. In a car truck, the combination of a side frame and a bolster, a coil spring, a leaf spring carried intermediate its ends by said side frame, one end of said leaf spring having non-resilient connection with said bolster, the other end of said leaf spring having resilient connection with said bolster through said coil spring, said coil spring being of constant pitch.

35. In a car truck, the combination of a side frame and a bolster, a spring carried by said side frame and supporting said bolster through a non-resilient engagement at one point and through a resilient connection at another point, said non-resilient engagement being through a member extending through an elongated aperture in said spring.

36. In a car truck, the combination of a side frame and a bolster, a spring carried by said side frame and supporting said bolster at a plurality of points and seated on said side frame, one end of said spring being provided with an elongated aperture receiving a member disposed on said bolster for movement in said aperture.

37. In a car truck, the combination of a side frame and a bolster, a coil spring, a member carried intermediate its ends directly by said side frame, one end of said member having a non-resilient connection with said bolster, the other end of said member having resilient connection with said bolster through said coil spring.

38. In a car truck, the combination of a side frame and a bolster, a leaf spring carried by said side frame and mounted on lateral motion rollers disposed on said side frame whereby said bolster may move laterally with respect thereto, and a coil spring interposed between an end of said leaf spring and said bolster.

39. In a car truck, the combination of a side frame and a load carrying member, a leaf spring carried by said side frame and mounted on lateral motion rollers disposed on said side frame whereby said load carrying member may move laterally with respect thereto, and a coil spring interposed between an end of said leaf spring and said load carrying member.

40. In a car truck, the combination of a side frame, a member rockably supported intermediate the ends thereof on said side frame, a load carrying member engaging said first named member, and resilient means interposed between a portion of said first named member and said load carrying member and outwardly of said side frame.

41. In a car truck, the combination of a side frame, a member rockably supported intermediate the ends thereof on said side frame, a load carrying member engaging said first named member, the support between said members being non-resilient and resilient, the resilient support being outwardly of the side frame.

42. In a car truck, the combination of a side frame, a bolster, a spring seat mounted on said side frame in the plane thereof, a spring carried by said seat and disposed thereabove, said spring supporting said bolster through a non-resilient engagement at one point and through a resilient connection at another point.

43. In a car truck, the combination of a side frame, a bolster, and a leaf spring arranged substantially parallel to said bolster, said spring being supported in the plane of said side frame and extending outwardly thereof and being provided with a coil spring for supporting said bolster at a point.

44. In a car truck, the combination of a side frame, a bolster, lateral motion means mounted on the side frame in the plane thereof, a spring carried by said lateral motion means and disposed thereabove, said spring supporting said bolster through a non-resilient engagement at one point and through a resilient connection at another point.

45. In a car truck, the combination of a side frame having a tension and compression member and spaced column guides, a bolster having guide members slidably cooperating with said guides, said bolster having an end portion extending outwardly of said side frame, a leaf spring mounted on said side frame between said guides and having an end disposed inwardly of said side frame and in supporting relation to said bolster, said spring having an outer end disposed outwardly of said side frame, and a coil spring interposed between said outer end of said spring and said end portion of said bolster and lateral motion means interposed between said leaf spring and said tension member.

46. In a car truck, the combination of a side frame and a load carrying member, a leaf spring carried directly on said side frame, and a coil spring supported on an end of said leaf spring and disposed between said leaf spring and load-carrying member and engaging said load carrying member.

47. In a car truck, the combination of a side frame, a bolster, a spring seat mounted on said side frame, a spring carried by said seat and disposed thereabove, said spring supporting said bolster through a non-resilient engagement at one point and through a resilient connection at another point, said non-resilient engagement including roller means mounted on an end of said leaf spring and engaging said bolster.

48. In a car truck, the combination of a side frame and a load carrying member, a coil spring, a member carried intermediate its end directly by the side frame, one end of said member having a non-resilient connection with said load carrying member through roller means, the other end of said member having resilient connection with said load carrying member through said coil spring.

49. In a car truck, the combination of a side frame having a tension and compression member and spaced column guides, a load carrying member having guide members slidably cooperating with said guides, said load carrying member having an end portion extending outwardly of said side frame, a leaf spring mounted on said side frame between said guides and having an end disposed inwardly of said guides and in supporting relation to said load carrying member through roller means engaging said leaf spring and load carrying member, said spring having an outer end disposed outwardly of said side frame, and a coil spring interposed between said outer end of said spring and said end portion of said load carrying member.

50. In a car truck, the combination of a side frame, a bolster, a friction assembly supported on the side frame at a point below said assembly, said assembly being connected to said bolster at a plurality of spaced points, and resilient means interposed between said friction assembly and said bolster.

51. In a car truck, the combination of a side frame, a bolster, a friction assembly supported on the side frame at a point below said assembly, said assembly being connected to said bolster at a plurality of spaced points, and a coil spring operatively interposed between a portion of said friction assembly and said bolster.

Signed at Chicago, Illinois, this 18th day of August, 1931.

WILLIAM C. HEDGCOCK.
ROBERT F. DARBY.